United States Patent
Park et al.

(10) Patent No.: US 7,949,324 B2
(45) Date of Patent: May 24, 2011

(54) METHOD FOR COMPENSATING TRANSMISSION CARRIER LEAKAGE AND TRANSCEIVING CIRCUIT EMBODYING THE SAME

(75) Inventors: Joonbae Park, Seoul (KR); Kyeongho Lee, Seoul (KR); Sang Hun Jung, Seoul (KR); Eal Wan Lee, San Jose, CA (US); In Ho Song, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 566 days.

(21) Appl. No.: 11/819,943

(22) Filed: Jun. 29, 2007

(65) Prior Publication Data

US 2008/0139161 A1 Jun. 12, 2008

(30) Foreign Application Priority Data

Jun. 30, 2006 (KR) .................. 10-2006-0060843

(51) Int. Cl.
*H04B 1/26* (2006.01)
(52) U.S. Cl. .................. 455/323; 455/114.2; 455/296; 375/346

(58) Field of Classification Search ............. 455/114.2, 455/115.1, 126, 127.2, 296, 232.1, 240.1, 455/313, 323; 375/296, 324, 346, 349
See application file for complete search history.

(56) References Cited

U.S. PATENT DOCUMENTS

2004/0038649 A1* 2/2004 Lin et al. .................. 455/130
2004/0106380 A1* 6/2004 Vassiliou et al. ............ 455/73

* cited by examiner

*Primary Examiner* — Nhan Le
(74) *Attorney, Agent, or Firm* — Muir Patent Consulitng, PLLC

(57) ABSTRACT

The application discloses embodiments of methods and/or systems for compensating a transmission carrier leakage of an up-conversion mixer, a tranceiving circuit or apparatus embodying the same. One embodiment of a method can include detecting an I channel DC offset $DCI_0$ and a Q channel DC offset $DCQ_0$ generated by a reception carrier leakage from an output of a down-conversion mixer, detecting an I channel DC offset DCI and a Q channel DC offset DCQ from the output of the down-conversion mixer while varying a compensation parameter being inputted to an up-conversion mixer that has its output coupled to an input of the down-conversion mixer to determine the compensation parameter that can reduce or minimize a transmission carrier leakage. A combination of a transmission baseband signal and the determined compensation parameter can be transmitted using the up-conversion mixer and an antenna to compensate for the transmission carrier leakage.

9 Claims, 5 Drawing Sheets

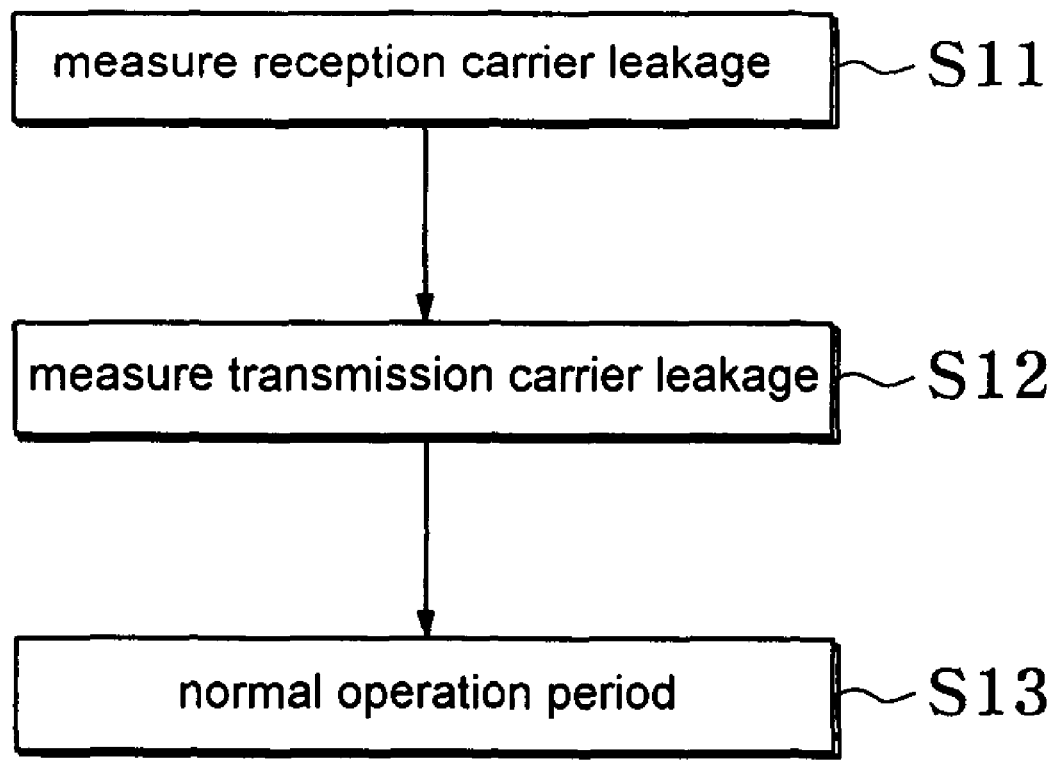

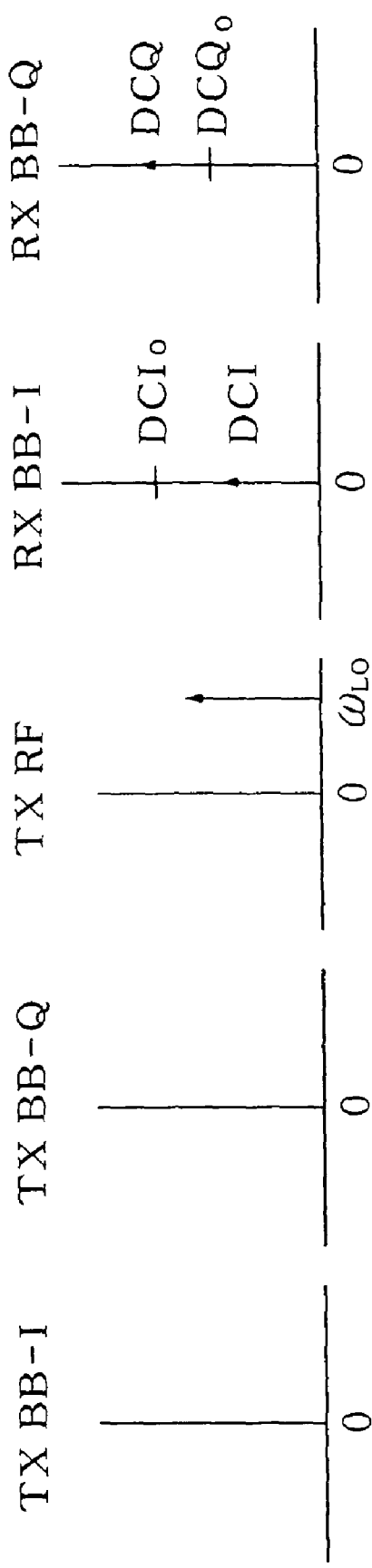

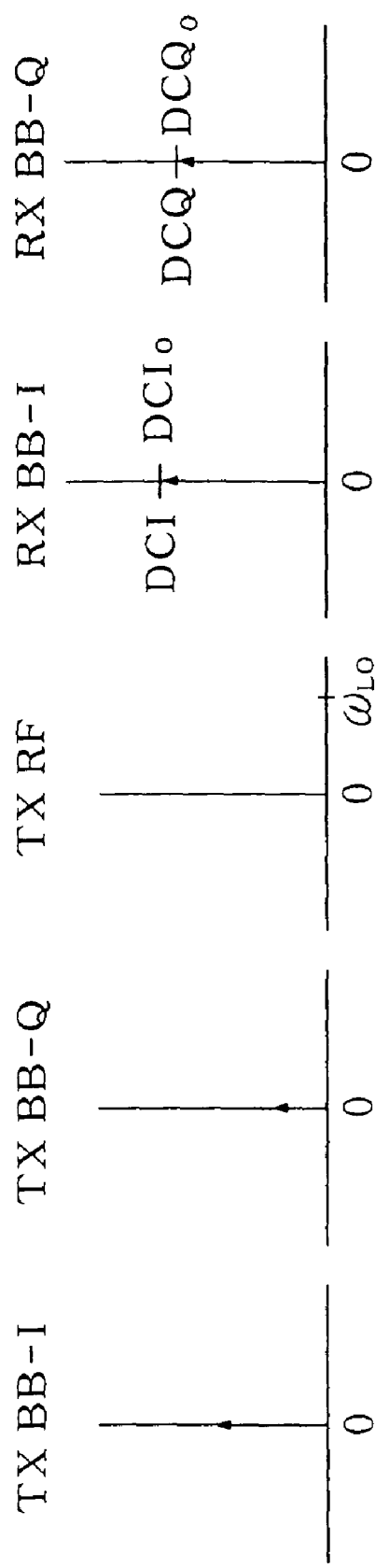

US 7,949,324 B2

METHOD FOR COMPENSATING TRANSMISSION CARRIER LEAKAGE AND TRANSCEIVING CIRCUIT EMBODYING THE SAME

FIELD OF THE INVENTION

The application relates to methods and systems for compensating a transmission carrier leakage of an up-conversion mixer and a tranceiving circuit embodying the same.

BACKGROUND OF THE INVENTION

A technique for converting a BB (base band) signal or an IF (intermediate) signal to an RF (radio frequency) signal, or converting the RF signal to the BB signal or the IF signal using a mixer is widely used in a field of a wireless communication. However, a carrier leakage occurs in a real mixer.

The carrier leakage is a phenomenon where not only a product of an input signal and an LO signal transmitted from a local oscillator is transmitted to an output stage, but the LO signal is also leaked to the output stage. When the carrier leakage occurs, an unwanted noise component exists in an output of the mixer to degrade a signal-to-noise ratio.

Korean Patent Publication No. 2005-0066953 titled "APPARATUS FOR COMPENSATING DC OFFSET, I/Q GAIN AND PHASE IMBALANCE AND COMPENSATION SYSTEM EMBODYING THE SAME" filed by Electronics and Telecommunications Research Institute discloses a technology for compensating a carrier leakage of an up-conversion mixer. In accordance with the 2005-0066953 Publication, a signal level detector for detecting a signal level ($I^2+Q^2$) for an RF signal, an analog-to-digital converter for converting an output of the signal level detector to a digital signal, a DC offset detector for integrating a product of an output of the analog-to-digital converter and a sign of I and Q channels to detect a DC offset of each of the channels, and a DC offset compensator for receiving an output of the DC offset detector to compensate the DC offset are disclosed.

However, the technology disclosed in the 2005-0066953 publication has various disadvantages including that analog circuits such as the signal level detector and the analog-to-digital converter should be added and digital circuits such as the DC offset detector and the DC offset compensator should be added to a general tranceiving circuit that does not compensate the carrier leakage. Moreover, in accordance with the technology disclosed in the 2005-0066953 Publication, since the analog-to-digital converter converts an original transmission signal having a relatively high level to the digital signal as well as the DC offset having a relatively low level caused by the carrier leakage, a detection and a compensation of the DC offset are not facile or effective because of a noise (e.g., quantum noise) generated during the conversion.

SUMMARY OF THE INVENTION

An object of embodiments of the application is to reduce or solve at least the above problems and/or disadvantages in the related art or to provide at least the advantages described herein in whole or in part.

An object of the application is to provide methods or systems to compensate carrier leakage (e.g., transmission carrier leakage) of a mixer (e.g., up-conversion mixer) or an apparatus such as a tranceiving circuit embodying the same.

Another object of the application is to provide methods for compensating a transmission carrier leakage of an up-conversion mixer or a tranceiving circuit embodying the same where carrier leakage is compensated without adding a separate analog circuit.

Another object of the application is to provide methods for compensating a transmission carrier leakage of an up-conversion mixer or a tranceiving circuit embodying the same where carrier leakage is compensated using a receiving circuit.

Another object of the application is to provide a method for compensating a transmission carrier leakage of an up-conversion mixer or a tranceiving circuit embodying the same where a signal including only a DC offset (e.g., no transmission BB signal) is used when detecting the DC offset caused by the transmission carrier leakage to take advantage of a resolution of a analog-to-digital converter, to be less affected by a noise (e.g., quantum), and/or to more accurately detect the DC offset.

To achieve objects of embodiments of the application in whole or in part, there is provided a method for compensating a transmission carrier leakage, the method can include detecting an I channel DC offset $DCI_0$ and a Q channel DC offset $DCQ_0$ generated by a reception carrier leakage from an output of a down-conversion mixer, detecting an I channel DC offset DCI and a Q channel DC offset DCQ from the output of the down-conversion mixer while varying a compensation parameter being inputted to an up-conversion mixer to select the compensation parameter reducing a combination signal from combining said I channel DC offsets ($DCI_0$, DCI) and a Q channel DC offsets ($DCQ_0$, DCQ) when the input of the down-conversion mixer is receiving an output of the up-conversion mixer and transmitting a sum of a transmission baseband signal including an information to be transmitted and the selected compensation parameter using the up-conversion mixer and an antenna to compensate for the transmission carrier leakage.

To achieve objects of embodiments of the application in whole or in part, there is provided a transceiver circuit that can include a DAC to perform an analog conversion of a signal inputted to the DAC, an up-conversion mixer to up-convert an output of the DAC, a down-conversion mixer to down-convert a signal inputted to the down-conversion mixer, an ADC coupled to the down-conversion mixer to perform a digital conversion of an output of the down-conversion mixer, a circuit to selectively input an output of the up-conversion mixer to the down-conversion mixer according to a first control signal, a digital processor coupled between the ADC and the DAC to detect an I channel DC offset $DCI_0$ and a Q channel DC offset $DCQ_0$ generated by a reception carrier leakage from an output of the ADC in a first mode, to detect an I channel DC offset DCI and a Q channel DC offset DCQ from the output of the ADC while varying a compensation parameter being inputted to the DAC in a second mode where the output of the up-conversion mixer is input to the down-conversion mixer, and to select a compensation parameter to reduce a combination of said I channel DC offsets ($DCI_0$, DCI) and a Q channel DC offsets ($DCQ_0$, DCQ) and an antenna coupled to an output of the up-conversion mixer to output a transmission baseband signal to be transmitted and the selected compensation parameter input to the DAC during an operation period.

Additional advantages, objects, and features of the invention will be set forth in part in the description which follows and in part will become apparent to those having ordinary skill in the art upon examination of the following or may be learned from practice of the invention. The objects and advantages of the application may be realized and attained as particularly pointed out in the appended claims.

BRIEF DESCRIPTION OF THE DRAWINGS

The embodiments will be described in detail with reference to the following drawings in which like reference numerals refer to like elements wherein:

FIG. 2 is a flow diagram illustrating a method for compensating a transmission carrier leakage in accordance with an embodiment.

FIGS. 3(a) through 5(e) are diagrams illustrating signals used in exemplary operations of detecting a reception carrier leakage, an initial step of detecting a transmission carrier leakage, and last step of detecting the transmission carrier leakage, respectively.

DETAILED DESCRIPTION OF THE PREFERRED EMBODIMENTS

Embodiments according to the application will be described with reference to the accompanying drawings. Such embodiments are exemplary and not to be construed as limiting. Many alternatives, modifications, and variations will be apparent to those skilled in the art.

Figure 1:
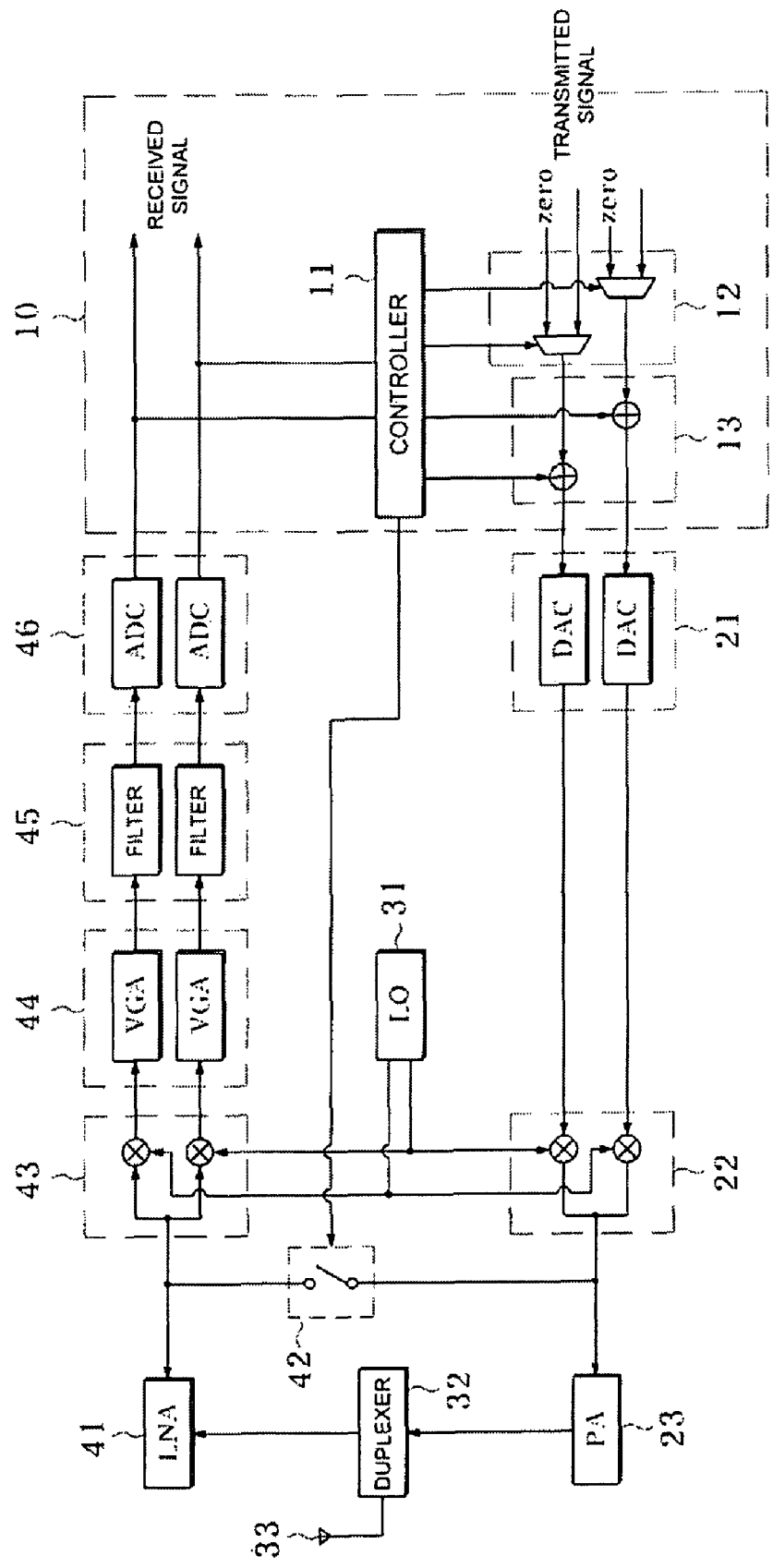
FIG. 1 is a diagram illustrating a tranceiving circuit in accordance with an embodiment.

FIG. 1 is a diagram illustrating a tranceiving circuit in accordance with an embodiment of the application. While one type (e.g., a TDD (time division duplex) of tranceiving circuit is depicted in FIG. 1, embodiments of a tranceiving circuit in accordance with the application are not intended to be limited to the exemplary TDD type tranceiving circuit.

As shown in FIG. 1, the tranceiving circuit can include a DAC (digital-to-analog converter) 21, an up-conversion mixer 22, a switch 42, a down-conversion mixer 43, an ADC (analog-to-digital converter) 46 and a digital processor 10. In addition, the tranceiving circuit may further include a power amplifier 23, a duplexer 32, a low noise amplifier 41, a variable gain amplifier 44, a filter 45 and a local oscillator 31.

The DAC 21 carries out an analog conversion of an input signal (e.g., information to be transmitted signal) to be outputted. The up-conversion mixer 22 can up-convert an output of the DAC 21 to be outputted. For this, the up-conversion mixer 22 can output a sum of a product of an I channel signal being outputted from the DAC 21 and an in-phase signal being outputted from the local oscillator 31 and a product of a Q channel signal being outputted from the DAC 21 and a quadrature signal being outputted from the local oscillator 31.

The power amplifier 23 amplifies an output of the up-conversion mixer 22 and outputs the amplified output. Although not shown, an additional amplifier may be disposed between the up-conversion mixer 22 and the power amplifier 23.

During a normal operation period e.g., when a transmission and a reception are carried out through the antenna 33, the duplexer 32 can transmit an output of the power amplifier 23 to an antenna 33 during a transmission period and transmit a received RF signal transmitted from the antenna 33 to the low noise amplifier 41 during a reception period. Preferably, the duplexer 32 neither transmits the received RF signal to the low noise amplifier 41 nor transmits the output of the power amplifier 23 to the antenna 33 during a reception carrier leakage detecting period and a transmission carrier leakage detecting period.

The low noise amplifier 41 can perform a low noise amplification of the received RF signal transmitted from the duplexer 32 to be transmitted to the down-conversion mixer 43. Although not shown, an additional amplifier may be disposed between the low noise amplifier 41 and the down-conversion mixer 43.

The switch 42 can operate according to a switch control signal, for example being outputted from a controller 11, and carry out a function where the output of the up-conversion mixer 22 is inputted to the down-conversion mixer 43 or not inputted to the down-conversion mixes 43. For example, the switch 42 does not input the output of the up-conversion mixer 22 to the down-conversion mixer 43 during the normal operation period and the reception carrier leakage detecting period, and can input the output of the up-conversion mixer 22 to the down-conversion mixer 43 during the transmission carrier leakage detecting period. While the switch 42 is coupled to an output terminal of the up-conversion mixer 22 and an input terminal of the down-conversion mixer 43 in FIG. 1, a position of the switch 42 is irrelevant when the output of the up-conversion mixer 22 can be selectively inputted to the down-conversion mixer 43. Thus, embodiments of the application are not intended to be limited by such an exemplary disclosure. For example, contrary to FIG. 1, the switch 42 may be disposed in the duplexer 32 to input or not input the amplified output of the up-conversion mixer 22 to the down-conversion mixer 43.

The down-conversion mixer 43 can down-convert an input signal to be outputted. For this, the down-conversion mixer 43 can output the product of the I channel signal being inputted and the in-phase signal being outputted from the local oscillator 31, and the product of the Q channel signal being inputted and the quadrature signal being outputted from the local oscillator 31.

The variable gain amplifier 44, which is an exemplary type of an amplifier, can amplify the output of the down-conversion mixer 43 to be outputted. The variable gain amplifier 44 may be omitted, or may be disposed between the down-conversion mixer 43 and the filter 45. However, embodiments are not intended to be so limited by such exemplary disclosure, for example, the variable gain amplifier 44 may be disposed between the filter 45 and the ADC 46.

The filter 45 can selectively output a signal of a predetermined band of an output of the variable gain amplifier 44. The ADC 46 can perform a digital conversion of an output of the filter 45.

The local oscillator 31 can provide the in-phase signal and the quadrature signal to the up-conversion mixer 22 and the down-conversion mixer 43. However, embodiments are not intended to be so limited by such exemplary disclosure, for example, while the up-conversion mixer 22 and the down-conversion mixer 43 receive the in-phase signal and the quadrature signal from the same local oscillator 31 in FIG. 1, the up-conversion mixer 22 and the down-conversion mixer 43 may have separate local oscillators. Thus, the up-conversion mixer 22 may receive the in-phase signal and the quadrature signal from a first local oscillator and the down-conversion mixer 43 may receive the in-phase signal and the quadrature signal from a second local oscillator.

The digital processor 10 can detect an I channel DC offset $DCI_0$ and a Q channel DC offset $DCQ_0$ generated by the reception carrier leakage from an output of the ADC 46 in a state during the reception carrier leakage detecting period where the output of the up-conversion mixer 22 is not inputted to the down-conversion mixer 43 and the received RF signal is not transmitted from the antenna 33 to the down-conversion mixer 43. Thereafter, the digital processor 10 can detect an I channel DC offset DCI and a Q channel DC offset DCQ from the output of the ADC 46 while varying a compensation parameter being inputted to the DAC 21 in a state where the output of the up-conversion mixer 22 is inputted to the down-conversion mixer 43 and the received RF signal is not transmitted from the antenna 33 to the down-conversion mixer 43 during the transmission carrier leakage detecting period to obtain the compensation parameter that reduces and preferably minimizes a combination of signals DCI and $DCI_0$ and/or DCQ and $DCQ_0$ (e.g., a sum of an absolute value of (DCI–$DCI_0$) and an absolute value of (DCQ–$DCQ_0$)).

Thereafter, a sum of a transmission BB signal including an information to be transmitted and the obtained compensation parameter is preferably inputted to the DAC 21 during the normal operation period where the output of the up-conversion mixer 22 is transmitted through the antenna 33. To perform such a process, the digital processor 10 can include the controller 11, a multiplexer 12 and a transmission carrier leakage compensator 13. However, embodiments of the application are not intended to be limited by such an exemplary disclosure.

The multiplexer 12 can operate according to a control of the controller 11, and output a predetermined test signal during the transmission carrier leakage detecting period and the transmission BB signal during the normal operation period. Preferably, the test signal represents a signal corresponding to zero, e.g., a signal that makes a power outputted from the DAC 21 zero when the transmission carrier leakage compensator 13 does not compensate the carrier leakage. However, embodiments of the application are not intended to be limited by such an exemplary disclosure.

The transmission carrier leakage compensator 13 can transmit a sum of an output of the multiplexer 12 and the compensation parameter being outputted from the controller 11 to the DAC 21. For example, the transmission carrier leakage compensator 13 may include two adders for obtaining a sum of an I channel compensation parameter being outputted from the controller 11 and the I channel signal being outputted from the multiplexer 12, and a sum of a Q channel compensation parameter being outputted from the controller 11 and the Q channel signal being outputted from the multiplexer 12.

The controller 11 can receive the output of the ADC 46, control the multiplexer 12 and output the switch control signal and the compensation parameter. While the controller 11 detects $DCI_0$, $DCQ_0$, DCI and DCQ from the output of the ADC 46 in FIG. 1 as described above, embodiments of the application are not intended to be limited by such an exemplary disclosure. For example, the controller 11 may detect $DCI_0$, $DCQ_0$, DCI and DCQ from an input of the ADC 46. In this case, the controller 11 may store $DCI_0$, $DCQ_0$ in a capacitor in an analog domain. In addition, while the transmission carrier leakage compensator 13 is disposed before the DAC 21 to input a signal having the transmission carrier leakage compensated to the DAC 21 in FIG. 1, the transmission carrier leakage compensator 13 may be disposed after the DAC 21. That is, after the transmission carrier leakage compensator 13 may receive the output of the DAC 21 to compensate the transmission carrier leakage, the compensated signal may be inputted to the up-conversion mixer 22. In this case, the transmission carrier leakage compensator 13 may comprise an analog circuit.

While the multiplexer 12, the transmission carrier leakage compensator 13, the DAC 21, the up-conversion mixer 22, the down-conversion mixer 43, the variable gain amplifier 44, the filter 45 and the ADC 46 are used in description of above exemplary embodiments, the application is not intended to be limited thereby. For example, the tranceiving circuit can include I and Q channel multiplexers, I and Q channel transmission carrier leakage compensators, I and Q channel DACs, I and Q channel up-conversion mixers, I and Q channel down-conversion mixers, I and Q channel variable gain amplifiers, I and Q channel filters, and I and Q channel ADCs or the like.

While the duplexer 32 can block the received RF signal from being inputted to the down-conversion mixer 43 during the reception carrier leakage detecting period and the transmission carrier leakage detecting period as described in the above description, exemplary embodiments of the application are not intended to be limited thereto as long as the received RF signal can be blocked from being inputted to the down-conversion mixer 43 by other components.

FIG. 2 is a flow diagram illustrating a method for compensating the transmission carrier leakage in accordance with an embodiment of the application. FIGS. 3(a)-3(b), 4(a)-4(e) and 5(a)-5(e) are diagrams illustrating exemplary signals corresponding to detecting the reception carrier leakage, detecting the transmission carrier leakage, and alternatively detecting the transmission carrier leakage, respectively.

Referring to FIGS. 2 through 5, one embodiment of a method for compensating the transmission carrier leakage can include a reception carrier leakage detecting process (block S11), a transmission carrier leakage detecting process (block S12) and normal operation process (block S13). The method embodiment of FIG. 2 will be described using the embodiment of FIG. 1, however, the method embodiment is not intended to be limited thereby.

In the reception carrier leakage detecting process (block S11), the I channel DC offset $DCI_0$ and the Q channel DC offset $DCQ_0$ generated by the reception carrier leakage (e.g., from the output of the down-conversion mixer 43) can be detected. In block S11, the received RF signal received by the antenna 33 is not inputted to the down-conversion mixer 43, and the output of the up-conversion mixer 22 is not inputted to the down-conversion mixer 43. Preferably, the controller 11 stores the I channel component and the Q channel component of a signal that is generated by passing the output of the down-conversion mixer 43 through the variable gain amplifier 44, the filter 45 and the ADC 46 as the I channel DC offset $DCI_0$ and the Q channel DC offset $DCQ_0$.

Figure 3A:
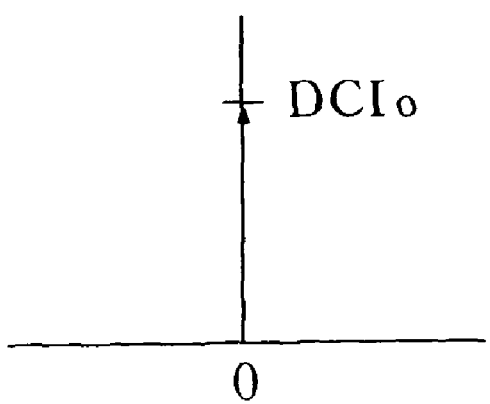
Figure 3B:
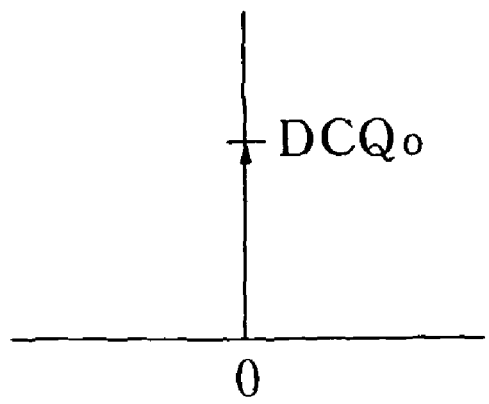

An example of the I channel DC offset $DCI_0$ and the Q channel DC offset $DCQ_0$ detected in the reception carrier leakage detecting process (block S11) are shown in FIGS. 3(a) and 3(b).

In the transmission carrier leakage detecting process (block S12), the I channel DC offset DCI and the Q channel DC offset DCQ from the output of the down-conversion mixer 43 are detected while varying the compensation parameter being inputted to the up-conversion mixer 22 in the state where the output of the up-conversion mixer 22 is inputted to the down-conversion mixer 43 to obtain the compensation parameter that reduces or preferably minimizes a logical combination such as the sum of the absolute value of (DCI–$DCI_0$) and/or the absolute value of (DCQ–$DCQ_0$). In this example, the received RF signal received by the antenna 33 is not inputted to the down-conversion mixer 43. In addition, the output of the up-conversion mixer 22 is not transmitted to the antenna 33. Preferably, the controller 11 stores the I channel component and the Q channel component of the signal that is generated by passing the output of the down-conversion mixer 43 through the variable gain amplifier 44, the filter 45 and the ADC 46 as the I channel DC offset DCI and the Q channel DC offset DCQ. Preferably, the compensation parameter, which can be a digital value being outputted from the controller 11, is passed through the DAC 21 to be inputted to the up-conversion mixer 22 when inputting the compensation parameter to the up-conversion mixer 22.

An example of the I channel signal and the Q channel signal being outputted from the DAC 21 in an early stage of the transmission carrier leakage detecting process (block S12) is shown in FIGS. 4(a) and 4(b), an example of the signal being outputted from the up-conversion mixer 22 is shown in FIG. 4(c), and an example of the I channel DC offset DCI and the Q channel DC offset DCQ being outputted from the ADC 46 is shown in FIGS. 4(d) and 4(e). The signals shown in FIGS. 4(a)-4(e) exemplify a case that an initial compensation parameter is zero. Since the initial compensation parameter is zero, the DAC 21 does not output any signals as shown in FIGS. 4(a) and 4(b). However, the up-conversion mixer 22 outputs a signal generated due to the transmission carrier leakage positioned at a carrier frequency $\omega_{LO}$ as shown in FIG. 4(c). Because of the signal generated due to the transmission carrier leakage, values of the I channel DC offset DCI and the Q channel DC offset DCQ differ from those of the I channel DC offset $DCI_0$ and the Q channel DC offset $DCQ_0$ as shown in FIGS. 4(d) and 4(e).

Of the transmission carrier leakage detecting process (block S12), in case the sum of the absolute value of (DCI–$DCI_0$) and the absolute value of (DCQ–$DCQ_0$) is a minimum (e.g., the sum is zero in particular), an example of the I channel signal and the Q channel signal being outputted from the DAC 21, the signal being outputted from the up-conversion mixer 22 and the I channel DC offset DCI and the Q channel DC offset DCQ being outputted from the ADC 46 is shown in FIGS. 5(a) through 5(e). In this case, since the compensation parameter is not zero, the transmission carrier leakage compensator 13 outputs a signal corresponding to the compensation parameter, and the DAC 21 outputs a signal having a DC power corresponding to the compensation parameter accordingly as shown in FIGS. 5(a) and 5(b). Accordingly, the transmission carrier leakage is compensated and the up-conversion mixer 22 does not output the signal generated due to the transmission carrier leakage as shown in FIG. 5(c). While FIG. 5 illustrates an example wherein the transmission carrier leakage is completely compensated, the transmission carrier leakage may not be completely compensated even when methods in accordance with the disclosed embodiments are used. In this case, a residue signal disposed at the carrier frequency $\omega_{LO}$ may exist contrary to FIGS. 5(a)-5(e). When the transmission carrier leakage is compensated, the values of the I channel DC offset DCI and the Q channel DC offset DCQ shown in FIGS. 5(d) and 5(e) are the same as those of the I channel DC offset $DCI_0$ and the Q channel DC offset $DCQ_0$. While the example where the sum of the absolute value of (DCI–$DCI_0$) and the absolute value of (DCQ–$DCQ_0$) is zero is shown in FIGS. 5(a)-5(e), a minimum value of the sum may not be zero even when the sum of the absolute value of (DCI–$DCI_0$) and the absolute value of (DCQ–$DCQ_0$) is obtained while varying the compensation parameter. In this case, the values of DCI and DCQ may not be same as those of $DCI_0$ and $DCQ_0$.

The reception carrier leakage detecting process (block S11) and the transmission carrier leakage detecting process (block S12) may be carried out at appropriate moments. For instance, the reception carrier leakage detecting process (block S11) and the transmission carrier leakage detecting process (block S12) may be carried out each time power is supplied. In addition, the reception carrier leakage detecting process (block S11) and the transmission carrier leakage detecting process (block S12) may be carried out when one of a supply voltage and a temperature is out of a predetermined range even after the power is supplied. For this, the tranceiver circuit may include at least one of a temperature sensor (not shown) and a sensor for detecting a level of the supply voltage. When the reception carrier leakage detecting process (block S11) and the transmission carrier leakage detecting process (block S12) are carried out after the power is supplied to the tranceiver circuit, embodiments of the application are not intended to be limited by such an exemplary disclosure. For example, blocks S11 and S12 may also be carried out when the signal to be transmitted and the signal to be received through the antenna do not exist.

In the normal operation process (block S13), the transmission carrier leakage is compensated by transmitting the sum of the transmission BB signal including the information to be transmitted and the compensation parameter obtained in the transmission carrier leakage detecting process (block S12) via the up-conversion mixer 22 and the antenna 33. In this case, the output of the up-conversion mixer 22 can be transmitted to the antenna 33 and the output of the up-conversion mixer 22 is not inputted to the down-conversion mixer 43. Preferably, the sum of the transmission BB signal, which is the digital value, and the compensation parameter obtained in the transmission carrier leakage detecting process (block S12), which is the digital value, are inputted to the up-conversion mixer 22 after passing passed through the DAC 21 when inputting the sum of the transmission BB signal and the compensation parameter obtained in the transmission carrier leakage detecting process (block S12) to the up-conversion mixer 22.

As shown in FIGS. 2-5(e), one method for compensating the transmission carrier leakage in accordance with one embodiment of the application can compensate the transmission carrier leakage.

In accordance with embodiments of a tranceiving circuit and/or a method for compensating the transmission carrier leakage in accordance with the application, an improved or optimum compensation parameter is obtained using the sum of the absolute value of (DCI–$DCI_0$) and the absolute value of (DCQ–$DCQ_0$). However, embodiments of the application are not intended to be limited by such an exemplary disclosure. For example, a sum of (DCI–$DCI_0)^2$ and (DCQ–$DCQ_0)^2$ may be used to obtain the compensation parameter (e.g., optimum compensation parameter) instead of using the sum of the absolute value of (DCI–$DCI_0$) and the absolute value of (DCQ–$DCQ_0$). While the two methods may have a small performance difference, such exemplary methods are similar in that the compensation is carried out using the receiving circuit and an accurate compensation can be obtained.

Embodiments of a tranceiving circuit and a method where the sum of (DCI–$DCI_0)^2$ and (DCQ–$DCQ_0)^2$ is used are similar to the above-described embodiments except that the sum of (DCI–$DCI_0)^2$ and (DCQ–$DCQ_0)^2$ is used instead of the sum of the absolute value of (DCI–$DCI_0$) and the absolute value of (DCQ–$DCQ_0$). Therefore, a detailed description is omitted here.

As described above, embodiments of systems or methods for compensating the transmission carrier leakage of the up-conversion mixer and/or tranceiving circuits embodying the same in accordance with the application have various advantages. For example, a transmission carrier leakage may be compensated. In addition, carrier leakage can be compensated using a receiving circuit such as a down-conversion mixer and an ADC. Further, carrier leakage may be compensated without adding the separate analog circuit.

Moreover, in accordance with one embodiment for compensating the transmission carrier leakage of the up-conversion mixer or a tranceiving circuit, the DC offset can be detected when the received RF signal having the relatively high level or the transmission signal transmitted from the base band processor does not exist, which can improve or achieve a highly accurate detection.

In one embodiment, carrier leakage can be detected using a signal that does not include the transmission BB signal having a relatively high level (e.g., a signal including only a DC offset can be used when detecting the DC offset due to the transmission carrier leakage to take advantage of a resolution of a analog-to-digital converter) to be less affected by a quantum noise, and to accurately detect the DC offset.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for compensating a transmission carrier leakage, the method comprising:
    detecting an I channel DC offset $DCI_0$ and a Q channel DC offset $DCQ_0$ generated by a reception carrier leakage from an output of a down-conversion mixer;
    detecting an I channel DC offset DCI and a Q channel DC offset DCQ from the output of the down-conversion mixer while varying a compensation parameter being inputted to an up-conversion mixer to select the compensation parameter reducing a combination signal from combining said I channel DC offsets ($DCI_0$, DCI) and a Q channel DC offsets ($DCQ_0$, DCQ) when the input of the down-conversion mixer is receiving an output of the up-conversion mixer; and
    transmitting a sum of a transmission baseband signal including an information to be transmitted and the selected compensation parameter using the up-conversion mixer and an antenna to compensate for the transmission carrier leakage.

2. The method in accordance with claim 1, wherein a RF signal received by the antenna is not inputted to the down-conversion mixer and the output of the up-conversion mixer is not inputted to the down-conversion mixer in said detecting an I channel DC offset $DCI_0$ and a Q channel DC offset $DCQ_0$, and
    wherein the received RF signal received by the antenna is not inputted to the down-conversion mixer in said detecting an I channel DC offset DCI and a Q channel DC offset DCQ.

3. The method in accordance with claim 2, wherein the output of the up-conversion mixer is not transmitted to the antenna in said detecting an I channel DC offset DCI and a Q channel DC offset DCQ, and
    wherein the output of the up-conversion mixer is not inputted to the down-conversion mixer in said transmitting a sum of a transmission baseband signal and the selected compensation parameter.

4. The method in accordance with claim 1, wherein the I channel DC offset $DCI_0$ and the Q channel DC offset $DCQ_0$ are respectively an I channel DC component and a Q channel DC component of a signal generated by passing the output of the down-conversion mixer through a filter and an ADC, and
    wherein the I channel DC offset DCI and the Q channel DC offset DCQ are respectively the I channel DC component and the Q channel DC component of the signal generated by passing the output of the down-conversion mixer through the filter and the ADC.

5. The method in accordance with claim 1, wherein, the compensation parameter having a digital value is inputted to the up-conversion mixer after passing through a DAC when inputting the compensation parameter to the up-conversion mixer in said detecting an I channel DC offset DCI and a Q channel DC offset DCQ, and
    wherein the sum of the transmission baseband signal having the digital value and the selected compensation parameter is inputted to the up-conversion mixer after passing through the DAC in said transmitting a sum of a transmission baseband signal and the selected compensation parameter.

6. The method in accordance with claim 1, wherein each of said detecting is performed each time a power is supplied, a temperature is out of a predetermined range or when a level of a supply voltage is out of a predetermined range.

7. The method in accordance with claim 1, wherein the selected compensation parameter is configured to reduce said combination signal by reducing a sum of an absolute value of ($DCI-DCI_0$) and an absolute value of ($DCQ-DCQ_0$).

8. The method in accordance with claim 1, wherein the selected compensation parameter is configured to reduce said combination signal by reducing a sum of $(DCI-DCI_0)^2$ and $(DCQ-DCQ_0)^2$.

9. The method in accordance with claim 1, wherein both of said detecting are performed each time a transmission/reception gap occurs.

* * * * *